(12) United States Patent
Kemmer

(10) Patent No.: US 12,429,169 B2
(45) Date of Patent: Sep. 30, 2025

(54) METHOD FOR FUELING A MEANS OF TRANSPORTATION USING A HYDROGEN FUELING DEVICE

(71) Applicant: Robert Bosch GmbH, Stuttgart (DE)

(72) Inventor: Helerson Kemmer, Vaihingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/552,659

(22) PCT Filed: Mar. 14, 2022

(86) PCT No.: PCT/EP2022/056525
§ 371 (c)(1),
(2) Date: Sep. 26, 2023

(87) PCT Pub. No.: WO2022/214272
PCT Pub. Date: Oct. 13, 2022

(65) Prior Publication Data
US 2024/0369187 A1    Nov. 7, 2024

(30) Foreign Application Priority Data
Apr. 6, 2021    (DE) ............ 10 2021 203 385.7

(51) Int. Cl.
*F17C 5/00*    (2006.01)
(52) U.S. Cl.
CPC ........ *F17C 5/007* (2013.01); *F17C 2221/012* (2013.01); *F17C 2250/043* (2013.01); *F17C 2265/065* (2013.01)
(58) Field of Classification Search
CPC ............... F17C 5/007; F17C 2221/012; F17C 2250/043; F17C 2265/065
(Continued)

(56) References Cited

U.S. PATENT DOCUMENTS

| 2002/0053365 | A1* | 5/2002 | Mutter | F17C 13/02 141/4 |
| 2010/0245098 | A1* | 9/2010 | Kanie | G01G 17/04 340/632 |
| 2012/0060584 | A1* | 3/2012 | Hobmeyr | G01L 27/005 73/1.57 |
| 2013/0146176 | A1* | 6/2013 | Yahashi | F17C 5/06 141/83 |
| 2016/0305611 | A1* | 10/2016 | Handa | F17C 5/06 |

(Continued)

FOREIGN PATENT DOCUMENTS

| DE | 112013002339 B4 | 8/2018 |
| DE | 112017001338 T5 | 12/2018 |

(Continued)

OTHER PUBLICATIONS

GebraBit (https://gebrabit.com/sensor-response-curve/) (Year: 2023).*
(Continued)

*Primary Examiner* — Craig M Schneider
*Assistant Examiner* — Christopher M Afful
(74) *Attorney, Agent, or Firm* — Michael Best & Friedrich LLP

(57) ABSTRACT

A method for fueling a means of transportation (4) using a hydrogen fueling device (6) is proposed, having the steps of setting up a communication connection between the hydrogen fueling device and the means of transportation, coupling a hydrogen delivery device to a tank (10) of the means of transportation and fueling the means of transportation, capturing a first hydrogen pressure of a hydrogen stream delivered by the hydrogen delivery device in the fueling device during fueling, capturing a second hydrogen pressure of the received hydrogen stream in the means of transportation during fueling, determining a discrepancy between the first hydrogen pressure and the second hydrogen pressure, and changing a sensor characteristic curve in the means of transportation in order to correct the capture of the second hydrogen pressure, if the discrepancy exceeds a threshold value.

13 Claims, 1 Drawing Sheet

(58) Field of Classification Search
USPC .......................................................... 141/95
See application file for complete search history.

(56) References Cited

U.S. PATENT DOCUMENTS

| | | | |
|---|---|---|---|
| 2018/0112828 A1* | 4/2018 | Bourgeois | F17C 13/026 |
| 2018/0292284 A1 | 10/2018 | Kim et al. | |
| 2019/0086032 A1* | 3/2019 | Handa | F17C 5/06 |
| 2019/0184847 A1* | 6/2019 | Mathison | F17C 13/028 |
| 2020/0411886 A1* | 12/2020 | Fukunaga | F17C 5/06 |
| 2024/0183496 A1* | 6/2024 | Oshima | F17C 5/007 |

FOREIGN PATENT DOCUMENTS

| | | | | |
|---|---|---|---|---|
| DE | 102018219835 | A1 | 5/2019 | |
| DE | 112019002858 | T5 | 2/2021 | |
| DE | 102019127336 | A1 * | 4/2021 | F17C 5/02 |
| EP | 1205704 | A1 | 5/2002 | |
| EP | 1450097 | A2 | 8/2004 | |
| EP | 2602752 | A1 | 6/2013 | |
| GB | 2579403 | A | 4/2013 | |
| JP | 2009133438 | A | 6/2009 | |
| JP | 2012041997 | A | 3/2012 | |
| JP | 2017067084 | A | 4/2017 | |
| JP | 2021046937 | A | 3/2021 | |
| WO | 2018215039 | A1 | 11/2018 | |

OTHER PUBLICATIONS

DE 102019127336 A1—English Translation (Year: 2021).*
Translation of International Search Report for Application No. PCT/EP2022/056525 dated Jun. 7, 2022 (2 pages).

* cited by examiner

METHOD FOR FUELING A MEANS OF TRANSPORTATION USING A HYDROGEN FUELING DEVICE

BACKGROUND

The present invention relates to a method for fueling a means of transportation using a hydrogen fueling device and a system for fueling a means of transportation using a hydrogen fueling device.

The prior art for fueling hydrogen-powered vehicles comprising a hydrogen tank is described in SE J2601, among others. It is set forth here, for example, in case of communication between the vehicle and a fueling device, that the vehicle will communicate a table one time prior to the fueling operation, which table contains a target pressure for the fueling operation as a function of ambient temperature and output pressure in the hydrogen tank prior to the fueling operation. For example, the fueling device can determine and execute a fueling plan therefrom. The sensors arranged in a fuel cell system or periphery are subject to manufacturing or lifetime tolerances. In complex systems, such as the fuel cell system, an unfavorable tolerance chain can lead to deficiencies in functioning.

SUMMARY

In means of transportation powered by hydrogen, for example by means of a fuel cell system, a precise pressure sensor for capturing a pressure in a hydrogen tank for reducing the tolerance chain would be useful. A problem addressed by the invention is to create a method that improves the accuracy of such a pressure sensor.

The problem is solved by a method for fueling a means of transportation using a hydrogen fueling device. Advantageous embodiments and further developments can be found in the sub-claims and the following description.

A method for fueling a means of transportation using a hydrogen fueling device is proposed, having the steps of setting up a communication connection between the hydrogen fueling device and the means of transportation, coupling a hydrogen delivery device to a tank of the means of transportation and fueling the means of transportation, capturing a first hydrogen pressure of a hydrogen stream delivered by the hydrogen delivery device in the fueling device during fueling, capturing a second hydrogen pressure of the received hydrogen stream and/or of the tank in the means of transportation during fueling, determining a discrepancy between the first hydrogen pressure and the second hydrogen pressure, and changing a sensor characteristic curve in the means of transportation in order to correct the capture of the second hydrogen pressure, if the discrepancy exceeds a threshold value.

For example, the setting up of a communication connection can include connecting the means of transportation to the hydrogen fueling device via a wireless network or other radio connection. It is conceivable that the hydrogen fueling device for this purpose has, or is coupled to, an infrastructure allowing a data link between the transportation and the hydrogen fueling device. Particularly noteworthy are wireless connections that prevent touching between the hydrogen fueling device and the means of transportation. In particular, metallic contacts must be avoided, because they lead to an explosion hazard in the vicinity of hydrogen-conducting devices in the event of spark formation. The communication connection is preferably bi-directional, so that data and parameters are transferrable in both directions during the fueling process.

Coupling a hydrogen delivery device to a tank can include the opening of a tank lid and the coupling of a tank nozzle. It is conceivable that the data link will be established when the tank lid is opened and/or when the tank nozzle is inserted. Alternatively, however, this can already be established at the time.

Fuel cell systems can comprise at least a second pressure sensor in the high pressure range, such as on or near the tank. During fueling, a control unit coupled to the second pressure sensor can communicate with the fueling device. Because the fueling device measures the pressure during fueling, this value can be exchanged and aligned with the pressure measurement on the side of the means of transportation. As a result, an excessive discrepancy of a pressure measurement by the second pressure sensor could be corrected such that a correction value, a correction term, or several correction values are stored in the respective second pressure sensor or the control unit and are considered in the delivery of the second hydrogen pressure. As a result, the sensor characteristic curve is adjusted, and more precise readings are generated.

It is contemplated to perform this procedure once or multiple times during each fueling operation. In the case of multiple execution, different variants could be considered for this purpose, which are further explained below. In addition to reducing the tolerance chain in the control of fuel cell systems, maintenance costs can also be reduced. In principle, sensors used could be realized at a lower cost because they can be calibrated or adjusted during fueling operations. Drifting of sensor signals over the lifetime can be compensated by the method according to the invention.

In one advantageous embodiment, the capture of the first and second hydrogen pressure is performed one time after commencement of the fueling. The determination of the discrepancy, as well as optionally the change of the sensor characteristic curve, could occur approximately at the start of the fueling operation. After a stable hydrogen stream has been established, the hydrogen pressure could be captured in the fueling device and the means of transportation. It is also contemplated, however, that the determination of the discrepancy will only be performed after a certain time after a stable hydrogen stream has been delivered for a specified period of time. This method step could also be carried out shortly before the end of the fueling operation.

However, it is preferred to perform the capture of the first and second hydrogen pressure and the determination of the discrepancy multiple times. Approximately several hydrogen pressure values could be captured at different times, which are then compared with one another. Individual measurements could thereby be supported among one another and subjected to a plausibility test. The capture of the hydrogen pressures on both sides does not necessarily need to be perfectly synchronous. It is contemplated that hydrogen pressures will be captured and saved with a timestamp in the fueling devices and in the means of transportation according to a specified pattern, which will then be aligned. They can be transmitted or picked up successively or simultaneously in order to be compared ad hoc or collected after the fueling process. The timestamps associated with the individual readings allow the mapping of the individual captured readings on both sides.

The determination of the discrepancy and/or the capture of the first and second hydrogen pressure could be repeated, for example, after a specified waiting period has elapsed. In particular, the capture of the hydrogen pressures could be carried out at regular or irregular intervals or a specified temporal pattern.

The determination of the discrepancy and/or the capture of the first and second hydrogen pressure could also be repeated after passing through a specified pressure change level. During fueling several pressure stages could be passed through, which are indicated, for example, in a fueling plan. When certain pressure levels are reached, a capture of the hydrogen pressures on both sides could be performed, wherein one or more of the readings are compared to one another.

Particularly advantageously, the second hydrogen pressure is transmitted from the means of transportation to the fueling device, wherein the fueling device determines the discrepancy. It can be assumed that the pressure sensor in the fueling device is more accurate than the pressure sensor in the means of transportation, because the fueling device performs a precise control of a fueling operation. The recording of the first hydrogen pressure could therefore already be carried out continuously during the fueling process, so that the recording of the second hydrogen pressure and the comparison only requires a small modification of a software program in the fueling system and the necessary means could already be present. If an intolerable discrepancy of the hydrogen pressures is determined, the fueling device could send a corresponding signal to the means of transportation, which could be implemented on the vehicle side.

Alternatively, the means of transportation could of course also be configured to determine the discrepancy. The fueling device can transmit the captured first hydrogen pressures to the means of transportation, where the discrepancy is then determined in order to adjust the sensor characteristic curve therefrom.

In one advantageous embodiment, the method comprises outputting a warning signal if the discrepancy exceeds a second threshold value that is higher than the first threshold value. The second threshold value could be defined such that exceeding it would have to be interpreted as a sensor defect. The warning signal can consequently be understood as a maintenance notice transmitted to and treated in a specified manner on the means of transportation. It can be sensible to continue the fueling operation after the output of a warning signal so that a safer working mode is taken.

It is particularly advantageous when the determination of the discrepancy and changing of the sensor characteristic curve occur after the fueling operation. Several hydrogen pressures can then be captured and compared, from which different discrepancies and more comprehensive change parameters can be determined. As a final step at the end or after the fueling operation, the sensor characteristic curve could be adjusted.

The method can further comprise the step of calculating or estimating a pressure drop between the fueling device and the means of transportation, i.e. the tank arranged therein. The pressure drop could be modeled or stored in the second control unit, or could be determined or transmitted by the fueling devices at the start of the fueling.

The means of transportation and/or fueling devices could be configured to perform the method during each fueling operation. A sensor characteristic curve in the means of transportation is then always adapted.

Analogously, the invention further relates to a system for fueling a means of transportation with hydrogen, comprising a fueling device with a hydrogen delivery device, a first connection unit, a first pressure sensor and a first control unit, a second connection unit and a second control unit for integration into a means of transportation, wherein the first pressure sensor is coupled to the first control unit and is configured to capture a first hydrogen pressure of a hydrogen stream delivered by the hydrogen delivery device, wherein the second control unit is configured to receive a second hydrogen pressure of the hydrogen stream and/or of a tank captured by a second pressure sensor in the means of transportation, and wherein one among the first control unit and the second control unit is configured to determine a discrepancy between the first hydrogen pressure and the second hydrogen pressure and to change a sensor characteristic curve in the means of transportation in order to correct the capture of the second hydrogen pressure, if the discrepancy exceeds a first threshold value.

Furthermore, the one among the first control unit and the second control unit can be configured to deliver a warning signal if the discrepancy exceeds a second threshold value that is higher than the first threshold value.

The system or the components included therein are also configured to perform one, several, or any of the method steps shown above.

Further measures improving the invention are described in more detail below on the basis of the figures, together with the description of the preferred embodiment examples of the invention.

DETAILED DESCRIPTION

Figure 1:
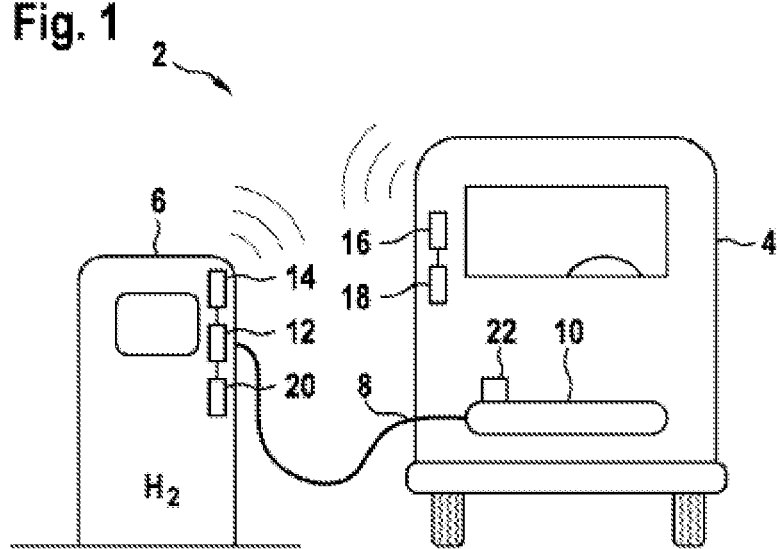
FIG. 1 a schematic illustration of the system for fueling a means of transportation.

FIG. 1 schematically shows a system 2 for fueling a means of transportation 4. In the case shown, the means of transportation 4 is, for example, a bus in which hydrogen is used via a fuel cell (not shown) in order to generate electric current. The system 2 comprises a hydrogen fueling device 6 which has a tank nozzle 8 as a hydrogen delivery device. This can be coupled to the means of transportation 4 in order to establish fluid communication with a tank 10 inside the means of transportation 4. The hydrogen fueling device 6 further comprises a first control unit 12 connected to a first connection unit 14.

The first connection unit 14 is capable of communicating with a second connection unit 16 of the means of transportation 4. This can be done either directly, i.e. as a point-to-point connection, or via a corresponding infrastructure. The second connection unit 16 is coupled to a second control unit 18. As a result, the first control unit 12 and the second control unit 18 can communicate with each other.

The fueling device 6 has a first pressure sensor 20 coupled to first control unit 12 and configured to capture a first hydrogen pressure of a hydrogen stream mass flow directed into the tank nozzle 8. Correspondingly, a second pressure sensor 22 is provided in the means of transportation 4, which is coupled to the tank 10 and the second control unit 18 and is configured to capture a second hydrogen pressure. This increases as fueling is performed by the fueling device 6. Due to the pressure equilibrium, the first hydrogen pressure corresponds to the second hydrogen pressure. Consequently, the readings of the first pressure sensor 20 and the second pressure sensor 22 are ideally identical. Due to aging and wear, in particular the second pressure sensor 22 can become increasingly imprecise. One among the first control unit 12 and the second control unit 18 is configured to determine a discrepancy between the first hydrogen pressure and the second hydrogen pressure and to change a sensor characteristic curve in the means of transportation 4 in order to correct the capture of the second hydrogen pressure, if the discrepancy exceeds a first threshold value. This improves the precision of the second pressure sensor 22 and compensates for sensor errors. Furthermore, the one among the first control unit 12 and the second control unit 18 can be configured to deliver a warning signal if the discrepancy exceeds a second threshold value that is higher than the first threshold value. This is particularly sensible in case of extreme deviations.

Figure 2:
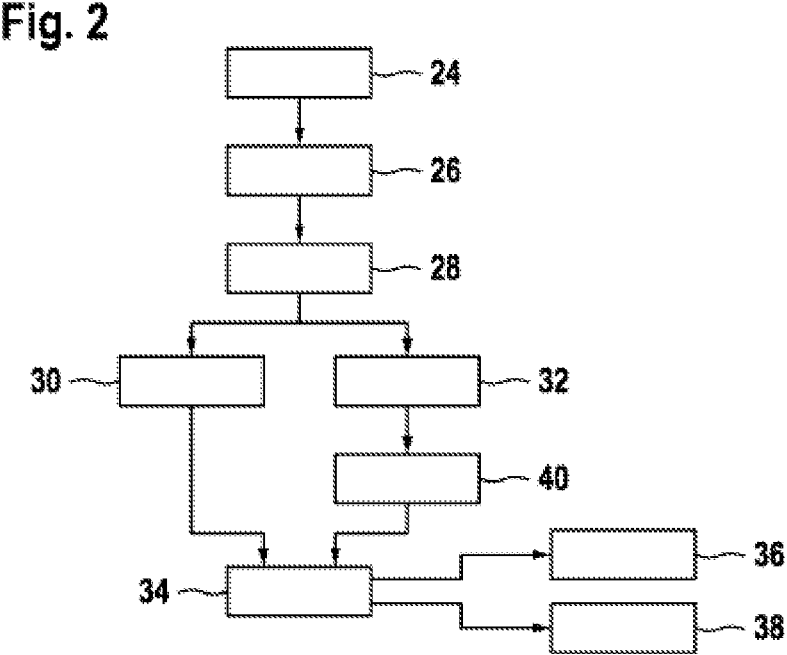
FIG. 2 a schematic illustration of the method according to the invention for fueling a means of transportation.

FIG. 2 shows a method for fueling the means of transportation 4 using the hydrogen fueling device 6. The method comprises the steps of setting up 24 a communication connection between the hydrogen fueling device 6 and the means of transportation 4, coupling 26 the hydrogen delivery device 8 to the tank 10 of the means of transportation 4, and fueling 28 of the means of transportation. During fueling, a first hydrogen pressure of a hydrogen stream delivered by the hydrogen delivery device 8 is captured 30 in the fueling device 6. Simultaneously, before or after, a second hydrogen pressure is captured in the means of transportation 32. A discrepancy between the first hydrogen pressure and the second hydrogen pressure is determined 34. If the discrepancy exceeds a first threshold value, a sensor characteristic curve in the means of transportation 4 is changed 36 in order to correct the capture of the second hydrogen pressure. If the discrepancy exceeds a second threshold value, a warning is also output 38. The second threshold value exceeds the first threshold value and could, for example, be twice as large, three times as large, or larger.

The capture 30 or 32 can occur several times. The captured second hydrogen pressures can also be transmitted 40 to the fueling device 6 in order to determine the discrepancy there. It is conceivable to independently and repeatedly capture the hydrogen pressures, for example at certain time intervals, after passing through certain pressure stages or in other patterns. The second hydrogen pressures can be transmitted to the fueling device 6 immediately following the respective capture or collected after the fueling operation. To uniquely identify the respective capture time, the individual hydrogen pressure values are each provided with a timestamp, for example. The first hydrogen pressure values captured in the fueling device 6 can also be timestamped. Thus, when measured synchronously or when passing through discrete pressure levels during fueling, the individual pressures can be compared to one other.

The invention claimed is:

1. A method for fueling a means of transportation (4) using a hydrogen fueling device (6), the method comprising the steps of:
setting up (24) a communication connection between the hydrogen fueling device (6) and the means of transportation (4),
coupling (26) a hydrogen nozzle delivery device (8) to a tank (10) of the means of transportation (4) and fueling the means of transportation (4),
capturing (30) a first hydrogen pressure of a hydrogen stream delivered by the hydrogen nozzle delivery device (8) in the fueling device (6) during fueling (28),
capturing (32) a second hydrogen pressure of the received hydrogen stream and/or the tank (10) in the means of transportation (4) during fueling (28),
determining (34) a discrepancy between the first hydrogen pressure and the second hydrogen pressure, and
correcting the capture of the second hydrogen pressure by changing (36) a sensor characteristic curve in the means of transportation (4) when the discrepancy exceeds a first threshold value, wherein the sensor characteristic curve is stored in memory.

2. The method according to claim 1, wherein the capture (30, 32) of the first and second hydrogen pressure is performed one time after commencement of the fueling (28).

3. The method according to claim 1, wherein the capture (30, 32) of the first and second hydrogen pressure and the determination (34) of the discrepancy is performed a plurality of times.

4. The method according to claim 3, wherein the determination (34) of the discrepancy and/or the capture (30, 32) of the first and second hydrogen pressure is repeated after a specified waiting period has elapsed.

5. The method according to claim 3, wherein the determination (34) of the discrepancy is repeated after passing through a specified pressure change level.

6. The method according to claim 1, wherein the second hydrogen pressure is transmitted from the means of transportation (4) to the fueling device (6), and
wherein the fueling device (6) determines the discrepancy (34).

7. The method according to claim 1, further comprising outputting (38) a warning signal if the discrepancy exceeds a second threshold value that is higher than the first threshold value.

8. The method according to claim 1, wherein the determination (34) of the discrepancy and the change (36) of the sensor characteristic curve occur after the fueling operation.

9. A system (2) for fueling a means of transportation with hydrogen, comprising:
a hydrogen fueling device (6) with a hydrogen nozzle delivery device (8), a first wireless connection unit (14), a first pressure sensor (20) and a first electronic control unit (12),
a second wireless connection unit (16) and a second electronic control unit (18) for integration into a means of transportation (4),
wherein the first pressure sensor (20) is coupled to the first electronic control unit (12) and is configured to capture a first hydrogen pressure of a hydrogen stream delivered by the hydrogen nozzle delivery device (8),
wherein the second electronic control unit (18) is configured to receive a second hydrogen pressure of the hydrogen stream or of a tank (10) in the means of transportation (4) captured by a second pressure sensor (22) in the means of transportation (4), and
wherein one among the first electronic control unit (12) and the second electronic control unit (18) is configured to determine a discrepancy between the first hydrogen pressure and the second hydrogen pressure and to correct the capture of the second hydrogen pressure by changing a sensor characteristic curve of the second pressure sensor (22) in the means of transportation (4) when the discrepancy exceeds a first threshold value, wherein the sensor characteristic curve is stored in memory.

10. The system (2) according to claim 9, wherein the one among the first electronic control unit (12) and the second electronic control unit (18) is configured to deliver a warning signal, if the discrepancy exceeds a second threshold value that is higher than the first threshold value.

11. The method according to claim 1, wherein the determining (34) the discrepancy between the first hydrogen pressure and the second hydrogen pressure is determined based on a comparison of the first hydrogen pressure and the second hydrogen pressure.

12. The method according to claim 1, wherein the sensor characteristic curve in the means of transportation (4) is changed using a correction value.

13. A method for fueling a means of transportation (4) using a hydrogen fueling device (6), the method comprising the steps of:
  setting up (24) a communication connection between the hydrogen fueling device (6) and the means of transportation (4),
  coupling (26) a hydrogen nozzle delivery device (8) to a tank (10) of the means of transportation (4) and fueling the means of transportation (4),
  capturing (30) a first hydrogen pressure of a hydrogen stream delivered by the hydrogen nozzle delivery device (8) in the fueling device (6) during fueling (28),
  capturing (32) a second hydrogen pressure of the received hydrogen stream and/or the tank (10) in the means of transportation (4) during fueling (28),
  determining (34) a discrepancy between the first hydrogen pressure and the second hydrogen pressure,
  changing (36) a sensor characteristic curve in the means of transportation (4) to correct the capture of the second hydrogen pressure when the discrepancy exceeds a first threshold value, wherein the sensor characteristic curve is stored in memory, and 'indicating a sensor defect if the discrepancy exceeds a second threshold value that is higher than the first threshold value.

* * * * *